(12) United States Patent
Emerson et al.

(10) Patent No.: US 9,413,828 B2
(45) Date of Patent: Aug. 9, 2016

(54) VIRTUALIZING A VIDEO CONTROLLER

(75) Inventors: Theodore F. Emerson, Tomball, TX (US); Jeffery L. Galloway, The Woodlands, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1297 days.

(21) Appl. No.: 12/999,209

(22) PCT Filed: Jul. 1, 2008

(86) PCT No.: PCT/US2008/068875
§ 371 (c)(1),
(2), (4) Date: Dec. 15, 2010

(87) PCT Pub. No.: WO2010/002396
PCT Pub. Date: Jan. 7, 2010

(65) Prior Publication Data
US 2011/0106520 A1 May 5, 2011

(51) Int. Cl.
*G06F 15/173* (2006.01)
*H04L 29/08* (2006.01)
*H04L 12/24* (2006.01)

(52) U.S. Cl.
CPC ............. *H04L 67/125* (2013.01); *H04L 12/24* (2013.01); *H04L 29/08846* (2013.01); *H04L 41/00* (2013.01)

(58) Field of Classification Search
CPC ...................................................... G09G 5/363
USPC .......................................... 709/224, 212, 223
See application file for complete search history.

(56) References Cited

U.S. PATENT DOCUMENTS

| | | | |
|---|---|---|---|
| 6,721,868 B1* | 4/2004 | Natu et al. | 711/202 |
| 8,028,040 B1* | 9/2011 | Hobbs et al. | 709/219 |
| 8,365,168 B1* | 1/2013 | Kodorkin | G06F 9/45558 718/1 |
| 2003/0088655 A1* | 5/2003 | Leigh et al. | 709/223 |
| 2006/0036775 A1* | 2/2006 | Levit-Gurevich | 710/1 |
| 2006/0039468 A1* | 2/2006 | Emerson | G06F 3/1454 375/240.01 |
| 2007/0276967 A1* | 11/2007 | Maciesowicz | 710/16 |
| 2010/0031325 A1* | 2/2010 | Maigne et al. | 726/4 |

FOREIGN PATENT DOCUMENTS

| | | |
|---|---|---|
| KR | 10-2004/0038750 | 5/2004 |
| KR | 10-2006/0079088 | 7/2006 |
| KR | 10-2008/0036047 | 4/2008 |

OTHER PUBLICATIONS

International Search Report and Written Opinion, dated Feb. 27, 2009, 10 pages.

* cited by examiner

*Primary Examiner* — Hitesh Patel
(74) *Attorney, Agent, or Firm* — Philip S. Lyren

(57) ABSTRACT

One embodiment is a remote system management controller that virtualizes a video controller for a server that is managed by a remote computer.

19 Claims, 3 Drawing Sheets

VIRTUALIZING A VIDEO CONTROLLER

FIELD OF THE INVENTION

The present invention relates to remote server management devices and more particularly to virtualizing a video controller in remote server management systems.

BACKGROUND

Remote server management devices facilitate remote access and administration of server computer systems. Remote console functionality allows a user to access a server from another computer, known as a management console. The management console enables a user to interact with the server as though the user were physically at the server.

The remote console functionality is beneficial because the user is provided with video and keyboard access, even when the Operating System (OS) of the server is down. The user therefore has the ability to perform various activities, such as access the server, install or uninstall the OS, perform diagnostics, reset the server, watch the reset process remotely, and view previously stored console activity, regardless of whether the server OS is online or offline.

Computing systems contain various hardware components. These hardware components, however, can be expensive to implement, especially in computing environments with a large number of servers. For example, in many system applications (such as blade servers), the system is deployed where local video access is either not desired or accessible. Implementing a video subsystem in each of the blade servers consumes valuable system board real-estate, increases the cost of the solution, and typically requires additional external components, such as video Random Access Memory (RAM).

DETAILED DESCRIPTION

Exemplary embodiments relate to remote server management devices and more particularly to virtualizing a video controller in remote server management systems.

One exemplary embodiment allows a system designer to manage a server computer system without a separate, dedicated, full video subsystem while retaining all of the benefits and customer usage patterns of computer systems with video hardware. The video controller is emulated by hardware and software in a remote management subsystem maintaining compatibility with software applications that use a predefined video subsystem, such as VGA (Video Graphics Array).

One exemplary embodiment uses an embedded server management technology, such as iLO (Integrated Lights-Out) or LOM (Lights Out Management). A remote server management device facilitates remote access and administration of server computer systems. Remote console functionality allows a user to access a server from another computer, known as a management console or a remote management device (RMD). The management console enables a user to interact with the server as though the user were physically at the server and interacting with the server with, for example, a display attached to the server.

A remote system management controller (RSMC) is provided in the servers and enables remote video without having a separate, dedicated, full video controller in the server. Hardware and software embedded in the RSMC makes the server believe or detect that it has a full, dedicated onboard video controller. Instead, all video is remotely generated and controlled in the RSMC. In other words, the virtual video controller is embedded in the iLO or the LOM (for example, in a expansion card or other removable printed circuit board).

With exemplary embodiments, a separate full video chip is not required or necessary in the server. The functions of the video chip are now provided in the iLO or LOM chip. Exemplary embodiments thus reduce system board costs for the servers and reduce complexity of retaining physical graphics display hardware on the system board of the server. The server can still be remotely monitored and controlled regardless of the health or state of the OS of the server. Furthermore, exemplary embodiments maintain customer experience and remote management capabilities of a graphic-based system.

Figure 1:
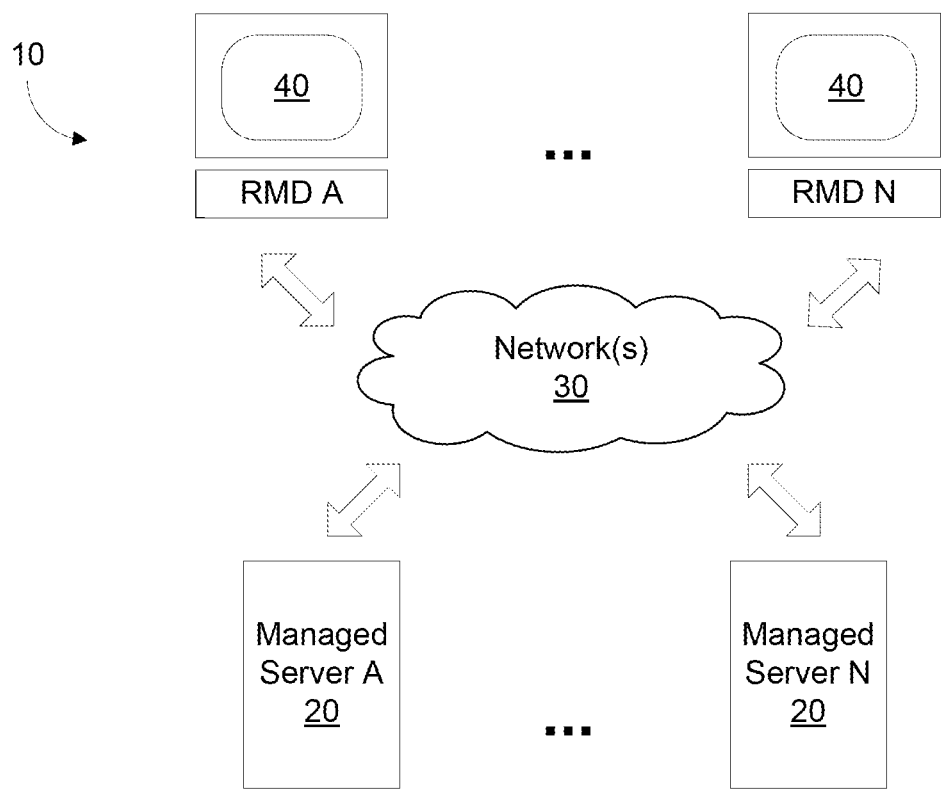
FIG. 1 shows a networked computer system including plural managed servers in communication with plural remote management devices in accordance with an exemplary embodiment of the present invention.

FIG. 1 shows a networked computer system 10 showing plural managed servers 20 (shown as managed server A to managed server N) in communication with one or more remote management devices 40 (shown as RMD A to RMD N) through one or more networks 30. The managed servers 20 include special circuitry and software for capturing, analyzing, compressing and transmitting video activity to the remote management devices 40 independent of an operating system (OS). This circuitry and software operate without regard to the existence or type of OS present on the managed server. Therefore, the remote management devices 40 can access, interact, and monitor the managed servers 20 from a remote console.

In the operation of the present invention, video data is captured, analyzed, compressed and transmitted to the remote management device 40 by circuitry and software in the managed server (for example, a remote system management controller) without reliance or interference with the operating system. The remote management device 40 includes hardware and software for receiving and interpreting transmitted data in order to reproduce on its own monitor the video data that would be displayed on a monitor directly connected to a managed server. The transmitted video data is encoded with special commands to permit the remote management device to interpret the data stream.

The network(s) 30 can be any sort of network capable of transmitting data between two devices. Without limitation, some examples of networks include a local area network (LAN), a wide area network (WAN), a hardwired point-to-point connection, a point-to-point connection over a telecommunications line, a wireless connection, and an internet connection.

The managed servers 20 are not limited to any particular type of server and include, but are not limited to, application servers, web servers, database servers, etc. In one exemplary embodiment, the managed servers are blade computers, such as blade servers operating in a rack, enclosure, or data center.

Embodiments in accordance with the present invention are not limited to any particular type of networked computer systems. The managed servers and/or remote management devices include various portable and non-portable computers and/or electronic devices including, but are not limited to, computers (portable and non-portable), servers, main frame computers, distributed computing devices, laptops, and other electronic devices and systems whether such devices and systems are portable or non-portable.

Figure 2:
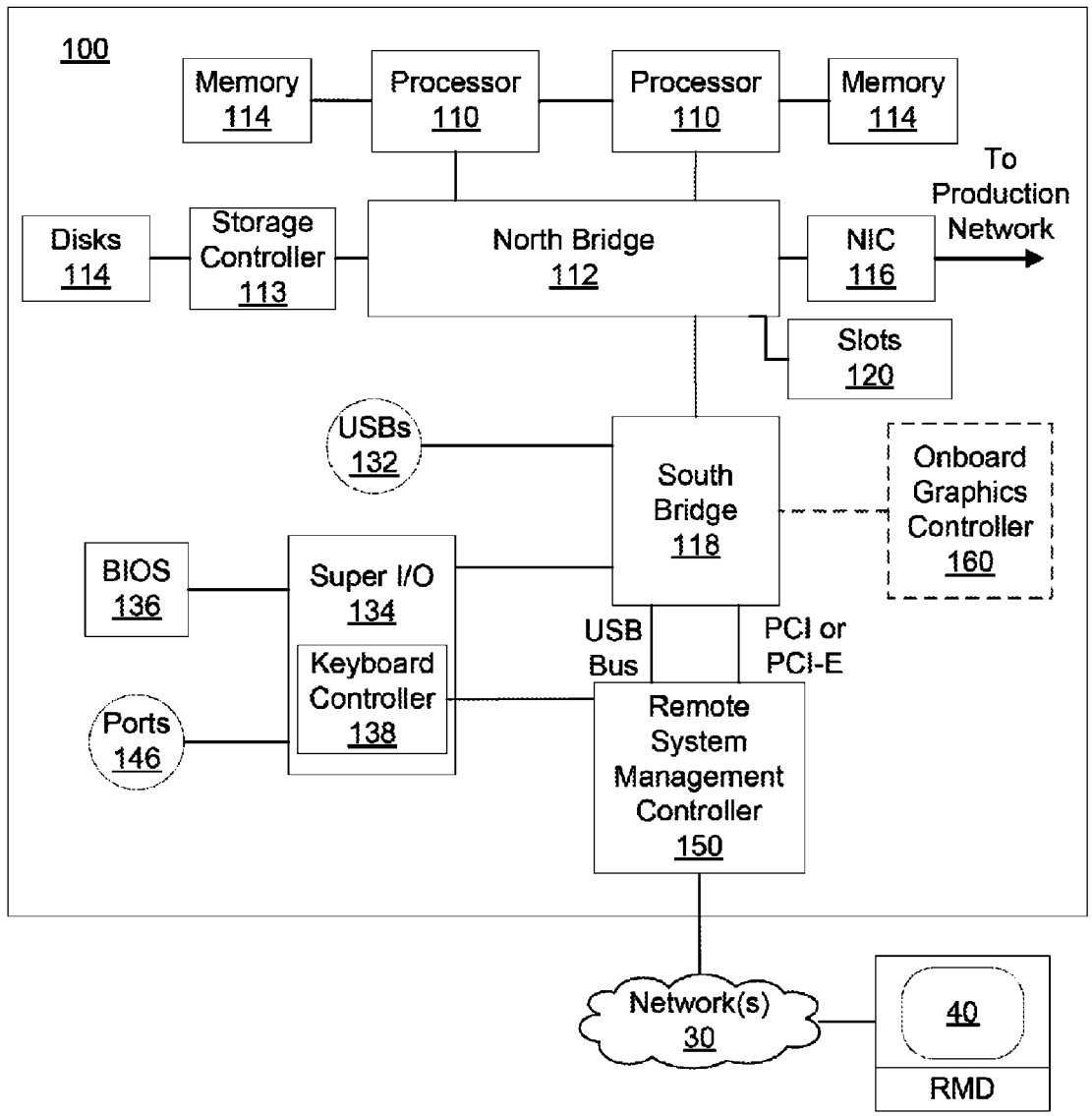
FIG. 2 shows a block diagram of a managed server with a remote system management controller in accordance with an exemplary embodiment of the present invention.

FIG. 2 shows a block diagram of a managed server 100 with a remote system management controller (RSMC) 150 coupled to a remote management device 40 through one or more networks 30 in accordance with an exemplary embodiment of the present invention.

The managed server 100 includes one or more processors 110 coupled to memory 114 through a memory bus interface. The processors 110 are coupled to a north bridge 112 through high speed processor links or point-to-point buses. The north bridge 112 is coupled to a storage controller 113 and one or more disks 114, a network interface card (NIC) 116 and one or more PCI-E slots 120.

A high speed serial link (such as a PCI-E link or proprietary link) couples the north bridge 112 to a south bridge 118. The south bridge 118 is an integrated multifunctional component that includes a number of functions, such as an enhanced direct memory access (DMA) controller, interrupt controller, timer, integrated drive electronics (IDE) controller, a universal serial bus (USB) host controller, an industry standard architecture (ISA) bus controller, etc. The south bridge 118 couples to one or more USBs 132 and a super I/O 134. The super I/O includes a keyboard controller 138 and also couples to basic input/output system (BIOS) ROM 136 and one or more ports 146. The south bridge also couples to the remote system management controller (RSMC) 150.

With exemplary embodiments, the functionality of displaying video is moved from the system board of the server into the RSMC 150 so that the RSMC has direct access to video hardware. Specifically, FIG. 2 shows an onboard graphics controller 160 in phantom or dashed lines to indicate that this device is physically removed from the managed server 100. Functionality of the graphics controller is placed in the RSMC 150. As such, the amount of video hardware required in the managed server 100 is reduced to only what is needed to create the remote video image at the RMD 40.

Figure 3:
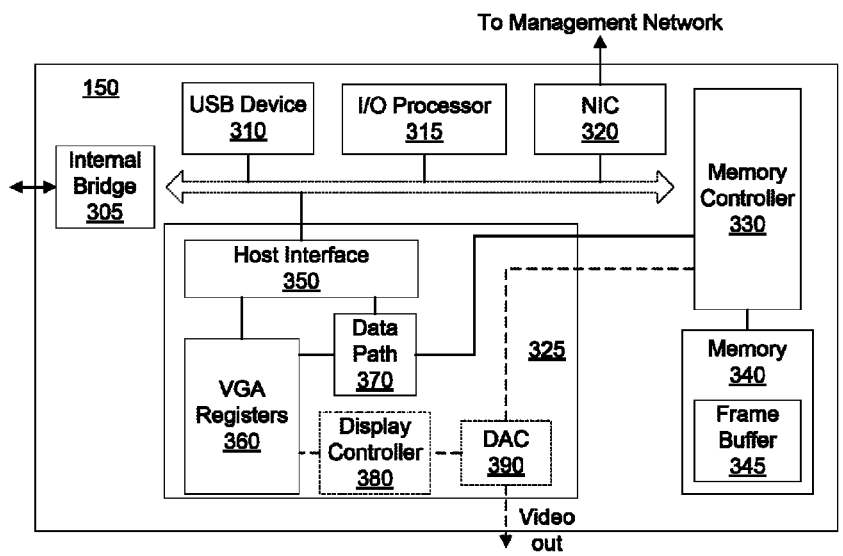
FIG. 3 shows a diagram of a remote system management controller in accordance with an exemplary embodiment of the present invention.

FIG. 3 shows a diagram of a remote system management controller (RSMC) 150 in accordance with an exemplary embodiment. The RSMC 150 includes a subset of the full, dedicated video hardware previously provided in the managed server (i.e., functionality of the onboard graphics controller 160 shown in FIG. 2).

The RSMC 150 includes an internal coupling device or bridge 305 connecting to the RSMC through a PCI or PCI-E bus. The RSMC 150 also includes a USB device 310, I/O processor 315, NIC 320, virtual video controller 325, and memory controller 330. The memory controller couples to memory 340 that includes a video frame buffer 345.

The video controller 325 is not a complete, full, dedicated video controller, but instead is a lightweight virtual video controller having just enough hardware to look like a full video controller. One or more hardware elements are removed and/or not present in the virtual video controller to make it a lightweight, functional, but inexpensive controller. By way of example, such removed hardware elements include, but are not limited to, one or more of a display refresh controller, DAC (digital to analog converter), digital output (such as TMDS, DVI, HDMI, display port), 2-D acceleration hardware, and/or 3-D acceleration hardware.

As shown, the virtual video controller 325 includes a host interface 350 that couples to VGA registers 360 and a data path 370. A display controller 380 and DAC 390 and corresponding data paths are shown in phantom or dashed lines to indicate that these components are not present or removed from the virtual video controller.

The RSMC 150 includes both hardware and software components for virtualizing a video controller for the managed server. A small amount of hardware is provided to assure basic compatibility to existing OS applications. This provides the register level interface that applications expect. This register level interface is preferably VGA, as most IA32-based applications assume the presence of this PC (personal computer) architectural component.

As noted, virtual or placebo VGA hardware is implemented as part of the remote server management subsystem (i.e., included in the RSMC 150). Since most server management subsystems typically contain a fairly large array of dedicated RAM, a portion of this RAM serves as "backing" memory for the video frame buffer. This is a natural fit as the server management subsystem is typically the remote video redirection component in a server. The amount of logic required to act as a software placebo is relatively small. The management processor provides the "video memory" component essentially for free.

The placebo or virtual video controller allows software running on a server to detect and "think" it has a full, complete video controller (when in fact no such full, complete video controller is present in the system board of the managed server). The placebo virtual video controller provides all the right responses and retains all the appropriate data in the same fashion as a full, dedicated actual VGA subsystem (i.e., as an actual onboard graphics controller 160 shown in FIG. 2 if such a controller were present). With the "placebo video controller" in place, the managed server is 100% VGA compatible from the perspective of software running on the managed server.

Exemplary embodiments also leverage an existing software abstraction layer for enhanced VGA resolutions. VGA controllers are generally capable of very limited display resolutions (for example, 640×480×16 colors). This limitation does not meet the video standards of many computers. Consequently, many modern video controllers contain "super" VGA enhancements to augment to the base VGA functionality. This presents a problem, however, since video vendors implement essentially the same functionality in completely different ways. As a result, SVGA controllers typically require a special OS driver to expose the capabilities of the particular hardware to the OS. In a pre-boot environment (before the OS loads), this presents a particular problem. To address this issue, an abstraction standard known as UGA (Universal Graphics Adapter) is used. UGA is essentially a set of BIOS calls that allow an operating system to query available video modes, set video modes, draw images without intimate knowledge of the underlying hardware. This allows windows to display images at high resolutions in the pre-boot or pre-load phases (during load and install operations). However, the existence of a UGA driver also suggests that the OS would function perfectly fine using the abstraction layer (although in one embodiment the OS loads a special driver to replace the UGA "crutch" once it has fully loaded).

One exemplary embodiment uses the UGA infrastructure to augment the "placebo VGA controller" hardware such that super VGA resolutions are virtually supported. Like the placebo hardware, placebo UGA firmware provides the OS with the ability to virtually render display images. The frame buffer is preferably kept in the main memory store of the remote management subsystem. By responding to the UGA abstraction calls, the remote management subsystem can behave exactly like a Super VGA (SVGA) controller. Consequently, the host computer operates as it would if a SVGA controller were present.

One exemplary embodiment provides a "portal" into the virtual world of the virtual video controller. This is a natural fit for the system management processor, already well equipped for providing remote video access. The remote management subsystem is adapted to pull images from the "backing" memory reserved for the virtual VGA function.

With exemplary embodiments, the actual video hardware required to implement video is much smaller than a complete video core, which represents a large cost savings (especially in servers or blades where local video on an attached display is either not desired or not accessible).

Figure 4:
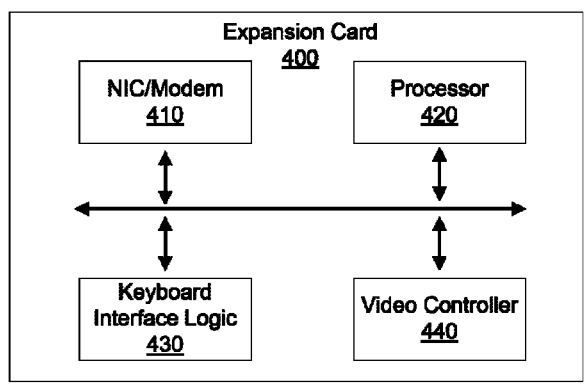
FIG. 4 shows a block diagram of an expansion card with remote console functionality in accordance with an exemplary embodiment of the present invention.

FIG. 4 shows a block diagram of an expansion card 400 with remote console functionality in accordance with an exemplary embodiment of the present invention. The expansion card includes NIC (Network Interface Card)/modem 410, a processor 420, keyboard interface logic 430, and a video controller 440. The expansion card is designed to couple to a bus in a managed server to provide remote console functionality for one or more managed servers in accordance with exemplary embodiments.

DEFINITIONS

As used herein and in the claims, the following words are defined as follows:

The word "blade" or "blade server" is a standardized electronic computing module that is plugged in or connected to a computer or storage system. A rack or blade enclosure provides various services, such as power, cooling, networking, various interconnects and management service, etc for blades within an enclosure. Together the individual blades form a blade system. The enclosure (or chassis) performs many of the non-core computing services found in most computers. Further, many services are provided by the enclosure and shared with the individual blades to make the system more efficient.

The terms "Integrated Lights Out" (iLO) or "Lights Out Management" (LOM) mean a server management technology that enables a remote electronic device or computer to perform activities on a server from a location remote to the server. For example, an iLO card has a separate network connection and its own IP (Internet Protocol) address to which a user can connect through HTTP (Hyper Text Markup Language) over the internet. The remote electronic device can perform actions such as reset the server, power-up the server, take over the screen of the server, mount remove physical CD/DVD drives or images, access the server's IML (Integrated Management Log), and provide a remote console for the server. Further, iLO and LOM can be used as an out-of-band management technology.

The term "out-of-band" management means a management channel for device maintenance that allows a system administrator to monitor and manage servers and other network equipment by remote control regardless of whether the server or network equipment is powered on.

The terms "virtual" or "virtualization" mean the abstraction of computer resources to hide physical characteristics of computing resources from users, applications, and/or software or hardware devices. For example, a video controller or video controller functionality is simulated as being in a managed server.

In one exemplary embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

Exemplary embodiments can be implemented with a variety of remote management controllers, such as embodiments in U.S. Pat. No. 6,819,322 incorporated herein by reference.

The methods in accordance with exemplary embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A remote server management controller (RSMC) for a server, comprising:
   a processor;
   a virtual video controller coupled to the processor, the virtual video controller comprising a subset of video hardware of a dedicated video controller and a host interface coupled to video graphics array (VGA) registers; and
   a memory controller coupled to the virtual video controller and memory, the memory comprising a frame buffer;
   wherein the server detects the virtual video controller as a dedicated video controller.

2. The RSMC of claim 1, wherein the subset of video hardware comprises a host interface for interfacing with other hardware in the RSMC and video graphics array (VGA) registers.

3. The RSMC of claim 2, wherein the subset of video hardware lacks a display controller or a digital to analog converter.

4. The RSMC of claim 1, wherein the virtual video controller provides video of the server to a remote computer.

5. The RSMC of claim 1, wherein the memory is random access memory (RAM).

6. The RSMC of claim 1 further comprising universal graphics adapter (UGA) infrastructure to augment video capabilities from video graphics array (VGA) to super VGA.

7. The RSMC of claim 1, wherein the virtual video controller does not drive a display.

8. A method, comprising:
virtualizing a dedicated video controller for a server utilizing a virtual video controller that comprises a subset of video hardware of a dedicated video controller and a host interface coupled to video graphics array (VGA) registers, the virtual video controller being located in a remote system management controller (RSMC);
detecting, by the server, the virtual video controller as a dedicated video controller; and
providing video images from the RSMC to a remote computer.

9. The method of claim 8, further comprising utilizing the remote computer to manage and monitor the server from a remote location.

10. The method of claim 8, further comprising maintaining compatibility with the RSMC and software applications executing on the server that use video graphics array (VGA).

11. The method of claim 10, further comprising detecting, by the software applications executing on the server, VGA registers located in the virtual video controller.

12. The method of claim 8, wherein the subset of video hardware lacks a display controller or a digital to analog converter.

13. The method of claim 8, further comprising augmenting video capabilities of the RSMC from video graphics array (VGA) to super VGA.

14. A system comprising:
a server; and
a remote system management controller (RSMC) on a printed circuit board, the RSMC virtualizes a dedicated video controller for the server utilizing a virtual video controller, the virtual video controller comprising a host interface coupled to video graphics array (VGA) registers and lacking a display controller and a digital to analog (DAC) converter;
wherein the server detects the virtual video controller as a dedicated video controller.

15. The system of claim 14, wherein the virtual video controller does not drive a display.

16. The system of claim 14, wherein the virtual video controller provides video of the server to a remote computer.

17. The system of claim 14, wherein software applications executing on the server maintain compatibility with the RSMC based on detection of the VGA registers.

18. The system of claim 14, further comprising universal graphics adapter (UGA) infrastructure to augment video capabilities from VGA to super VGA.

19. The system of claim 14, wherein the RSMC comprises a memory controller coupled to the virtual video controller and memory, the memory comprising a frame buffer.

* * * * *